(12) United States Patent
Watanabe et al.

(10) Patent No.: US 12,439,121 B2
(45) Date of Patent: Oct. 7, 2025

(54) DISPLAY CONTROL DEVICE, DISPLAY CONTROL METHOD, AND PROGRAM

(71) Applicant: Saturn Licensing LLC, New York, NY (US)

(72) Inventors: Takuo Watanabe, Tokyo (JP); Nobuhiro Ozu, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/288,051

(22) PCT Filed: Oct. 18, 2019

(86) PCT No.: PCT/JP2019/041054
§ 371 (c)(1),
(2) Date: Apr. 23, 2021

(87) PCT Pub. No.: WO2020/090514
PCT Pub. Date: May 7, 2020

(65) Prior Publication Data
US 2021/0385539 A1    Dec. 9, 2021

(30) Foreign Application Priority Data
Nov. 2, 2018   (JP) ................. 2018-207282

(51) Int. Cl.
*H04N 21/4545*    (2011.01)
*H04N 21/422*    (2011.01)
(Continued)

(52) U.S. Cl.
CPC . *H04N 21/45455* (2013.01); *H04N 21/42204* (2013.01); *H04N 21/47205* (2013.01); *H04N 21/482* (2013.01); *H04N 21/4858* (2013.01)

(58) Field of Classification Search
CPC .. H04N 21/47; H04N 21/482; H04N 21/4532; H04N 21/84; H04N 21/4622; H04N 21/4316; H04N 21/4821
See application file for complete search history.

(56) References Cited

U.S. PATENT DOCUMENTS 6,005,601 A      12/1999  Ohkura et al.
6,169,543 B1 *   1/2001   Wehmeyer ........... H04N 21/482
                                                   725/110
(Continued)

FOREIGN PATENT DOCUMENTS

CN       1170302 A     1/1998
CN     102135977 A     7/2011
(Continued)

OTHER PUBLICATIONS

International Search Report for PCT/JP2019/041054 mailed Nov. 26, 2019; 3 pages.

(Continued)

*Primary Examiner* — Jason Salce
(74) *Attorney, Agent, or Firm* — Lerner David LLP

(57) ABSTRACT

The present technology relates to a display control device, a display control method, and a program that have enabled further improvement of operability.
Provided is a display control device including a display control unit configured to perform control to display filter information regarding a filter and first information regarding content in a first area of a display screen, and to display, in a case where a user performs a first operation, the filter information and second information regarding the content in a second area of the display screen, the second area being greater than the first area. The present technology can be applied, for example, to a television receiver.

20 Claims, 15 Drawing Sheets

(51) Int. Cl.
  *H04N 21/472* (2011.01)
  *H04N 21/482* (2011.01)
  *H04N 21/485* (2011.01)

(56) References Cited

U.S. PATENT DOCUMENTS

| | | | | |
|---|---|---|---|---|
| 6,262,722 | B1* | 7/2001 | Allison | H04N 21/431 |
| | | | | 725/39 |
| 6,481,010 | B2* | 11/2002 | Nishikawa | H04N 21/47211 |
| | | | | 725/40 |
| 7,454,777 | B1 | 11/2008 | Nishikawa et al. | |
| 10,230,917 | B2* | 3/2019 | Stallings | H04N 21/47 |
| 2002/0044144 | A1* | 4/2002 | Inoue | H04H 60/72 |
| | | | | 345/204 |
| 2002/0170057 | A1* | 11/2002 | Barrett | H04N 21/4524 |
| | | | | 725/43 |
| 2003/0208763 | A1* | 11/2003 | McElhatten | G06F 3/0482 |
| | | | | 348/E7.071 |
| 2004/0032528 | A1* | 2/2004 | Park | H04N 21/47 |
| | | | | 725/39 |
| 2004/0250280 | A1* | 12/2004 | Allport | H04N 21/47 |
| | | | | 725/39 |
| 2005/0028204 | A1 | 2/2005 | Nakamura et al. | |
| 2005/0084239 | A1* | 4/2005 | Kobayashi | H04N 21/4622 |
| | | | | 348/E5.002 |
| 2007/0156521 | A1* | 7/2007 | Yates | H04N 21/4312 |
| | | | | 725/60 |
| 2008/0127262 | A1* | 5/2008 | Neufeld | H04N 21/4316 |
| | | | | 725/40 |
| 2012/0291071 | A1 | 11/2012 | Seo et al. | |
| 2014/0089980 | A1* | 3/2014 | Alexander | H04N 21/4314 |
| | | | | 725/42 |
| 2015/0082350 | A1 | 3/2015 | Ogasawara et al. | |
| 2015/0281794 | A1 | 10/2015 | Choi et al. | |
| 2017/0041660 | A1 | 2/2017 | Lee et al. | |
| 2017/0230723 | A1 | 8/2017 | Blanc | |

FOREIGN PATENT DOCUMENTS

| | | |
|---|---|---|
| CN | 104216620 A | 12/2014 |
| CN | 104272754 A | 1/2015 |
| CN | 104954883 A | 9/2015 |
| CN | 106454457 A | 2/2017 |
| DE | 102011011350 A1 | 8/2012 |
| EP | 2523465 A2 | 11/2012 |
| EP | 2613554 A1 | 7/2013 |
| JP | 2001513595 A | 9/2001 |
| JP | 2005159624 A | 6/2005 |
| JP | 2008271031 A | 11/2008 |
| JP | 2008271034 A | 11/2008 |
| JP | 2009522859 A | 6/2009 |
| JP | 2009218734 A | 9/2009 |
| JP | 2013141177 A | 7/2013 |
| JP | 2015125617 A | 7/2015 |
| JP | 2017038313 A | 2/2017 |
| KR | 20120125939 A | 11/2012 |

OTHER PUBLICATIONS

Search Report dated Dec. 25, 2023 from the Office Action for Chinese Application No. 201980070386.4 issued Dec. 28, 2023, 12 pages.

Chan, Tony F. "The Digital TV Filter and Nonlinear Denoising", Institute of Electrical and Electronics Engineers (IEEE), IEEE Transactions on Image Processing, Feb. 2001, 11 pages, vol. 10, Issue 2.

Yao, Li, "Design of Embedded List of Films Based on S3C2410 and Linux", Microcontrollers & Embedded Systems, Jul. 2014, 4 pages. [English translation of Abstract only.].

* cited by examiner

FIG. 4

| INFORMATION GRANULARITY / AT-A-GLANCE READABILITY | DETAILED PROGRAM INFORMATION | CURRENT PROGRAM GUIDE | PROGRAM GUIDE |
|---|---|---|---|
| INFORMATION GRANULARITY | FINE (DETAILED INFORMATION) | MIDDLE (SOMEWHAT DETAILED INFORMATION) | COARSE (COARSE INFORMATION) |
| AT-A-GLANCE READABILITY | LOW (ONE) | MIDDLE (ONE ROW) | HIGH (FULL SCREEN) |

| INFORMATION GRANULARITY | DETAILED CONTENT INFORMATION | INFORMATION AND REPRODUCTION OPERATION PANEL | CONTENT TABLE |
|---|---|---|---|
| | FINE (DETAILED INFORMATION) | MIDDLE (SOMEWHAT DETAILED INFORMATION) | COARSE (COARSE INFORMATION) |
| AT-A-GLANCE READABILITY | LOW (ONE) | MIDDLE (ONE ROW) | HIGH (FULL SCREEN) |

FIG. 13

| | TELEVISION BROADCASTING (STB INPUT) | RECORDING USB HDD, DTCP-IP) | USB | DLNA | APPLICATION | EXTERNAL INPUT |
|---|---|---|---|---|---|---|
| | | | SWITCH VIEWING TYPE | | | |
| VIEWING | VIEWING SCREEN | VIEWING SCREEN | VIEWING SCREEN | VIEWING SCREEN | VIEWING SCREEN | VIEWING SCREEN |
| CONTENT SELECTION | GUIDE/Zapping UI | RECORDING LIST | CONTENT LIST | CONTENT LIST | CONTENT LIST | |
| OPERATION SETTINGS | OPERATION AND SETTINGS | OPERATION AND SETTINGS | OPERATION AND SETTINGS | OPERATION AND SETTINGS | OPERATION AND SETTINGS | OPERATION AND SETTINGS |
| | | | OPERATION AND SETTINGS OF TELEVISION MAIN BODY | | | |

DISPLAY CONTROL DEVICE, DISPLAY CONTROL METHOD, AND PROGRAM

CROSS-REFERENCE TO RELATED APPLICATIONS

This application is a national phase entry under 35 U.S.C. § 371 of International Application No. PCT/JP2019/041054 filed Oct. 18, 2019, which claims the priority from Japanese Patent Application No. 2018-207282 filed in the Japanese Patent Office on Nov. 2, 2018, the entire contents of which are hereby incorporated by reference.

TECHNICAL FIELD

The present technology relates to display control devices, display control methods, and programs, in particular to a display control device, a display control method, and a program that have enabled further improvement of operability.

BACKGROUND ART

Display control devices, such as television receivers, have been able to provide various functions with the increasing sophistication thereof in recent years (see, Patent Document 1, for example).

CITATION LIST

Patent Document

Patent Document 1: Japanese Patent Application Laid-Open No. 2015-125617

SUMMARY OF THE INVENTION

Problems to be Solved by the Invention

In the meantime, while a display control device, such as a television receiver, is configured to display various types of screens in providing various functions, improving of its operability is demanded.

The present technology has been made in view of such a situation, and enables further improvement of operability.

Solutions to Problems

A display control device according to an aspect of the present technology is a display control device including a display control unit configured to perform control to display filter information regarding a filter and first information regarding content in a first area of a display screen, and to display, in a case where a user performs a first operation, the filter information and second information regarding the content in a second area of the display screen, the second area being greater than the first area.

A display control method and program according to an aspect of the present technology are the display control method and program corresponding to the display control device according to an aspect of the present technology described above.

In the display control device, the display control method, and the program according to an aspect of the present technology, filter information regarding a filter and first information regarding content are displayed in a first area of a display screen, and in a case where a user performs a first operation, the filter information and second information regarding the content are displayed in a second area of the display screen, the second area being greater than the first area.

Note that a display control device according to an aspect of the present technology may be an independent device, or may be an internal block included in a single device. For example, a display control device according to an aspect of the present technology may be configured as a display control unit included in a display control device, such as a television receiver.

BRIEF DESCRIPTION OF DRAWINGS

FIG. 4 is a diagram illustrating a relationship between information granularity and at-a-glance readability of respective screens in FIG. 3.

FIG. 7 is a diagram illustrating a display example of a program guide screen.

FIG. 8 is a diagram illustrating a display example of a program guide screen.

FIG. 11 is a diagram illustrating a relationship between information granularity and at-a-glance readability of respective screens in FIG. 10.

FIG. 13 is a diagram illustrating a bird's-eye image of a seamless UI.

MODE FOR CARRYING OUT THE INVENTION

Embodiments of the present technology are now described with reference to the drawings. Note that the description is given in the following order.

1. First Exemplary Embodiment
2. Second Exemplary Embodiment
3. Variation
4. Configuration of Computer 1. First Exemplary Embodiment (Configuration of Display Control Device)

Figure 1:
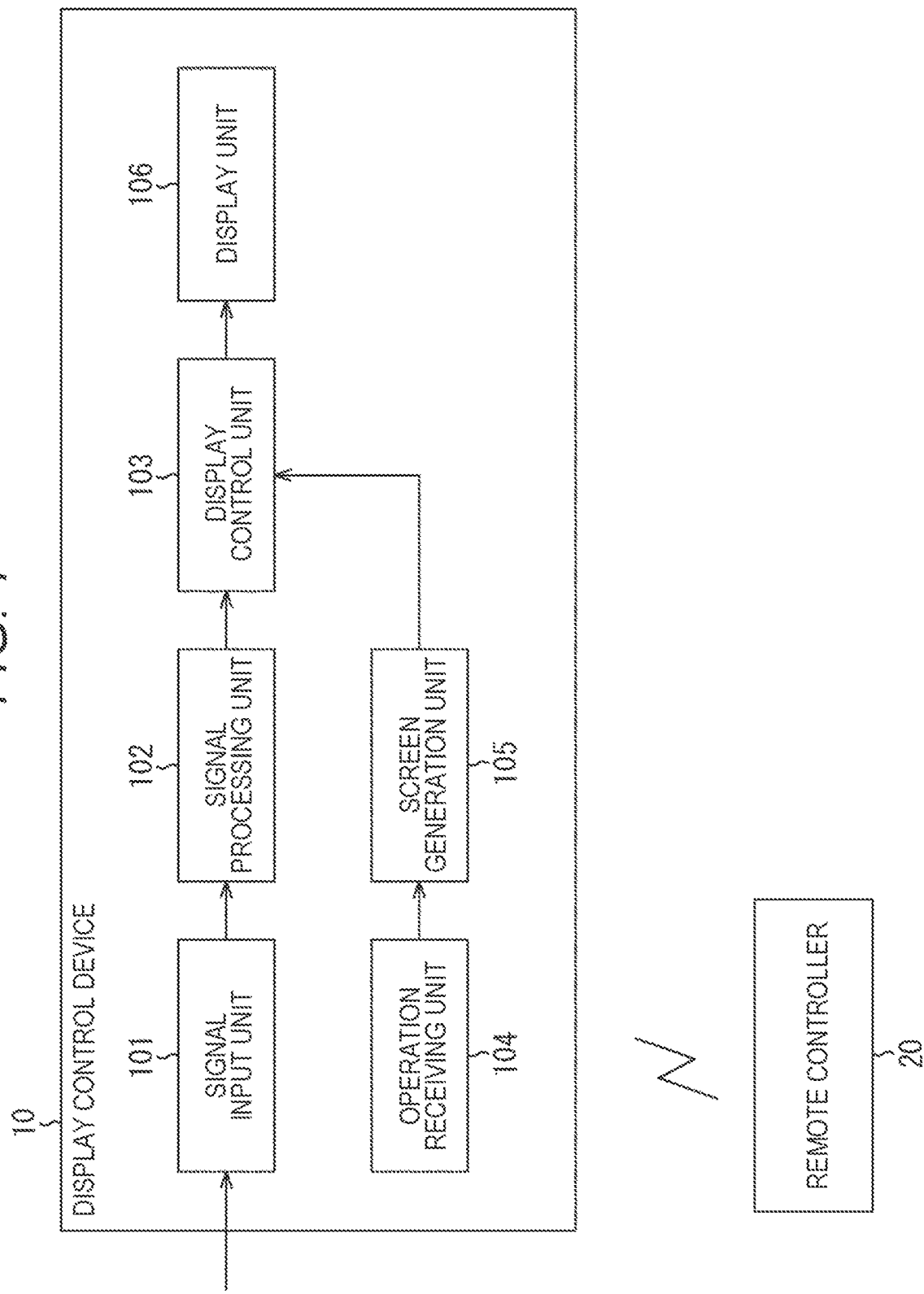
FIG. 1 is a block diagram illustrating an example of a configuration of an embodiment of a display control device to which the present technology is applied.

FIG. 1 is a block diagram illustrating an example of a configuration of an exemplary embodiment of a display control device to which the present technology is applied.

In FIG. 1, a display control device 10 is a television receiver configured as, for example, a liquid crystal display device, an organic light emitting diode (OLED) display device, or the like. The display control device 10 includes a signal input unit 101, a signal processing unit 102, a display control unit 103, an operation receiving unit 104, a screen generation unit 105, and a display unit 106.

The signal input unit 101 includes, for example, a tuner and the like. In a case where the signal input unit 101 is configured as a tuner, the signal input unit 101 performs processing, such as demodulation processing, on a broadcast signal received via an antenna (not illustrated), and supplies the resultant signal to the signal processing unit 102. The broadcast signal herein carries broadcast content that is transmitted in accordance with a predetermined broadcast system (e.g., a television program), such as terrestrial broadcasting, satellite broadcasting, and cable television broadcasting.

Note that the signal input unit 101 is not limited to the tuner and may be configured as, for example, a communication module so that a communication content (internet content) signal distributed from a content distribution site via a communication network, such as the internet, is input to the signal processing unit 102.

Further, the signal input unit 101 may be configured as, for example, a High-Definition Multimedia Interface (HDMI) (registered trademark] or an interface compliant with a predetermine standard, such as Universal Serial Bus (USB) so that signals of recorded content that is recorded by a recorder or a network storage and storage content stored in a storage medium, such as a semiconductor memory and an optical disc, are input to the signal processing unit 102. Note that the recorded content may be the one that is recorded by a television receiver and is stored in a storage.

The signal processing unit 102 includes, for example, a system-on-chip or the like. The signal processing unit 102 performs processing, such as decoding, on the signal supplied from the signal input unit 101, and supplies an image signal obtained as a result thereof to the display control unit 103.

The display control unit 103 includes, for example, a microcomputer, a central processing unit (CPU), or the like. The display control unit 103 generates an image signal for controlling the drive of the display unit 106 on the basis of the image signal supplied from the signal processing unit 102. The display control unit 103 drives the display unit 106 on the basis of the generated image signal.

The display unit 106 includes, for example, a liquid crystal display unit, an OLED display unit, or the like. The display unit 106 displays images of broadcast content, such as a television program, and images of various types of screens in accordance with the control of the display control unit 103.

For example, in a case where the display control device 10 is a liquid crystal display device, the display unit 106 serving as a liquid crystal display unit is a display panel in which pixels containing a liquid crystal element and a thin film transistor (TFT) element are two-dimensionally arranged, and performs display by modulating light emitted from a backlight (not illustrated) in accordance with the drive of the display control unit 103. Further, for example, in a case where the display control device 10 is an OLED display device, the display unit 106 serving as an OLED display unit is a display panel in which pixels containing a self-luminous element are two-dimensionally arranged, and performs display in accordance with the drive of the display control unit 103.

The operation receiving unit 104 includes, for example, a short-range wireless communication module, an infrared receiving module, or the like. The operation receiving unit 104 receives a signal (receive light), such as a wireless signal and an infrared signal, transmitted from a remote controller 20, and supplies a command corresponding to the received signal to each unit of the screen generation unit 105 and the like. Note that, for example, communication compliant with a Bluetooth (registered trademark) standard can be performed as the short-range wireless communication.

The screen generation unit 105 generates various types of screens on the basis of the command supplied from the operation receiving unit 104, and supplies a screen signal thereof to the display control unit 103. The display control unit 103 drives the display unit 106 on the basis of the screen signal supplied from the screen generation unit 105.

Note that, while only a system related to the image signals is illustrated in the display control device 10 of FIG. 1 for the sake of simplification of illustration, in practice, a system related to voice signals is included to output a sound in synchronization with the images of broadcast content. Additionally, while FIG. 1 illustrates a case where the command from the operation receiving unit 104 is supplied only to the screen generation unit 105 for the sake of simplification of illustration, in practice, each unit of the display control device 10 operates in accordance with the command from the operation receiving unit 104.

(Configuration of Remote Controller)

Figure 2:
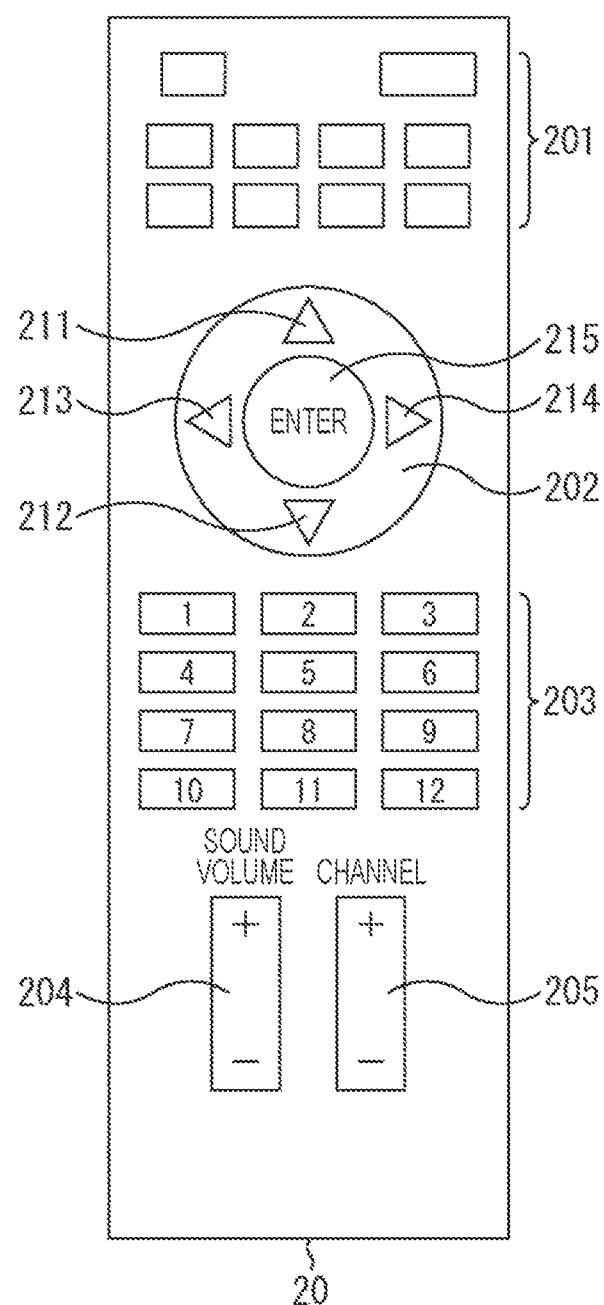
FIG. 2 is a diagram illustrating an example of an external view of a remote controller in FIG. 1.

FIG. 2 illustrates an example of an external view of a remote controller 20 in FIG. 1.

The remote controller 20 is provided with, as physical buttons, a button group 201 including, for example, a power button, an input switching button, and the like, and a cross button 202 which moves a cursor (pointer) or the like, up, down, left, or right on the screen. The button group 201 can include various types of buttons, such as a current program guide key, a program guide key, a detailed information key, and the like as described later.

The cross button 202 includes an up key 211 which moves the cursor or the like in an upward direction, a down key 212 which moves the cursor or the like in a downward direction, a left key 213 which moves the cursor or the like in a left direction, and a right key 214 which moves the cursor or the like in a right direction. Moreover, the cross button 202 further includes at the center thereof an enter button 215 which is pressed at a point to be selected.

The remote controller 20 is provided further with a channel selection button group 203 including buttons with inscriptions from "1" to "12," a sound volume adjustment button 204 with which a sound volume is freely adjusted to the up direction or the down direction, and a channel selection button 205 with which a channel is freely selected to the up direction or the down direction.

Note that the external view of the remote controller 20 illustrated in FIG. 2 is merely an example, and other buttons may be provided. Additionally, while the current program guide key, the program guide key, and the detailed information key have been described to be allocated to the button group 201 in the foregoing description, the current program guide key and the like may be allocated to other buttons, such as the cross button 202.

The display control device 10, which is configured as described above, enables the provision of various functions. For example, the display control device 10 enables the provision of the function of a seamless transition when switching from the current program guide which is displayed while being superimposed on part of an image during the viewing of a television program, to the program guide which is displayed in full screen.

Hereinbelow, a description will be provided of the function of a seamless screen transition provided by the display control device 10 to which the present technology is applied (hereinbelow, also referred to as a seamless user interface [UI]).

(Example of Seamless UI)

Figure 3:
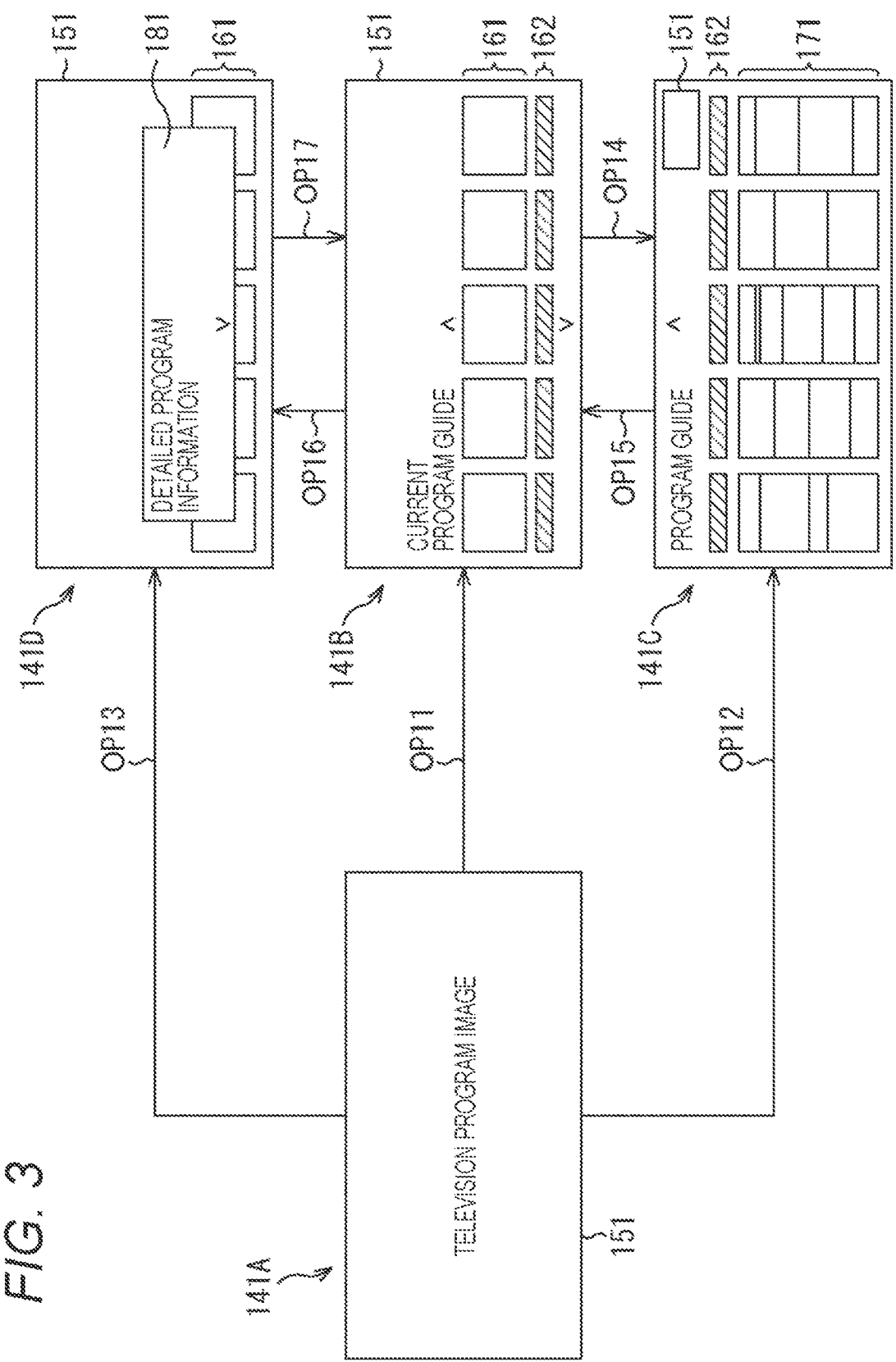
FIG. 3 is a diagram illustrating an example of a seamless UI in a case of television viewing.

FIG. 3 illustrates an example of a seamless UI while a television program is being viewed.

FIG. 3 illustrates examples of screen transitions and display content in the display control device 10 when respective operations from an operation OP11 to an operation OP17, which are each a user operation performed on the remote controller 20, are performed in a case where a display screen of the display unit 106 displays a television viewing screen 141A, a current program guide superimposition screen 141B, a program guide screen 141C, or a detailed program information superimposition screen 141D.

Here, in a case where, for example, the user holding the remote controller 20 operates the current program guide key allocated to a button, such as the button group 201 and the cross button 202, as the operation OP11 during the display of the television viewing screen 141A displaying a television program image 151, the current program guide superimposition screen 141B is displayed.

On this current program guide superimposition screen 141B, a current program guide 161 and a filter column 162 are displayed while being superimposed on a lower area (half screen) of the television program image 151 displayed on the entire display screen of the display unit 106.

The current program guide 161 is an area including information regarding programs on other channels (programs in the same time slot on different channels) during television viewing. A piece of information regarding each program displayed in the current program guide 161 (square in the diagram) can be selected by the operation of, for example, the left key 213 or the right key 214 of the cross button 202 provided on the remote controller 20.

The filter column 162 is an area including information regarding a filter for, for example, Favorites, dramas, and movies (filter information). The use of this filter enables desired content to be narrowed.

Here, in a case where, for example, the down key 212 of the cross button 202 provided on the remote controller 20 is operated as the operation OP14 by the user during the display of the current program guide superimposition screen 141B, the program guide screen 141C is displayed. Note that the "case where the down key 212 is operated" herein means that there is no target to be selected in the downward direction on the display screen, such as when the cursor is positioned on the filter column 162 on the current program guide superimposition screen 141B.

On this program guide screen 141C, a program guide 171 is displayed on the entire display screen (full screen) of the display unit 106, and the filter column 162 is displayed on an upper area thereof. Further, in an upper right area on the program guide screen 141C, the television program image 151 is displayed in a sub screen. Specifically, in comparison of an area in which the current program guide 161 and the filter column 162 are displayed on the current program guide superimposition screen 141B (first area) with an area in which the program guide 171 and the filter column 162 are displayed on the program guide screen 141C (second area), the second area can be said to be larger than the first area.

The program guide 171 is an area including information in which the broadcast schedule of television programs is organized in a table on the basis of channels (broadcasting stations) and broadcasting time. A piece of information regarding each program displayed in the program guide 171 (a square in the diagram) can be selected by, for example, respective four direction keys of the cross button 202 provided on the remote controller 20 being operated. The filter column 162 is an area including the information regarding the filter, such as Favorites.

More specifically, the filter column 162 of the program guide screen 141C is provided in correspondence with the filter column 162 of the current program guide superimposition screen 141B. These filter columns 162 are arranged at positions each indicate that the current program guide 161 and the program guide 171 are relevant. Moreover, the television program image 151 that is displayed in the sub screen on the program guide screen 141C is a reduced-size image obtained by reducing in size the television program image 151 that is displayed on the current program guide superimposition screen 141B in full screen, and is assumed to be the same television program.

Here, in a case where, for example, the up key 211 of the cross button 202 provided on the remote controller 20 is operated as the operation OP15 by the user during the display of the program guide screen 141C, the current program guide superimposition screen 141B is displayed. Note that the "case where the up key 211 is operated" herein means that there is no target to be selected in the upward direction on the display screen, such as when the cursor is positioned on the filter column 162 on the program guide screen 141C.

In such a manner, in a case where the down key 212 is operated during the display of the current program guide superimposition screen 141B (operation OP14), a transition from the current program guide superimposition screen 141B to the program guide screen 141C is made. By contrast, in a case where the up key 211 is operated during the display of the program guide screen 141C (operation OP15), a transition from the program guide screen 141C to the current program guide superimposition screen 141B is made. In other words, operating the up key 211 and the down key 212 of the cross button 202 of the remote controller 20 enables the transition between the current program guide superimposition screen 141B and the program guide screen 141C back and forth.

Moreover, in the transition from the current program guide superimposition screen 141B to the program guide screen 141C, the program guide 171 may also be being appearing from below to above while the filter column 162 may be being upwardly moved within the screen. Further, conversely, in the transition from the program guide screen 141C to the current program guide superimposition screen 141B, the program guide 171 may also be being downwardly disappearing while the filter column 162 may be being downwardly moved in the screen. Such a transition gives an impression of a shift being seamless to the user.

Here, the filter column 162 is provided below the current program guide 161 on the current program guide superimposition screen 141B, whereas the filter column 162 is provided above the program guide 171 on the program guide screen 141C. Such an arrangement gives the user an impression of a more seamless transition between the current program guide superimposition screen 141B and the program guide screen 141C in an operation using the up key 211 and the down key 212 than in a case where the filter column 162 is provided on upper sides of both the current program guide superimposition screen 141B and the program guide screen 141C.

Note that, in a case where, for example, the user operates the program guide key allocated to the button group 201 or the like of the remote controller 20 as the operation OP12 during the display of the television viewing screen 141A, the program guide screen 141C is directly displayed.

On the other hand, in a case where, for example, the up key 211 of the remote controller 20 is operated, as the operation OP16, by the user during the display of the current program guide superimposition screen 141B, the detailed program information superimposition screen 141D is displayed. Note that the "case where the up key 211 is operated" here means that there is no target to be selected in the upward direction on the display screen, such as when the cursor is positioned on the current program guide 161 on the current program guide superimposition screen 141B.

On this detailed program information superimposition screen 141D, detailed program information 181 is displayed while being superimposed on the current program guide 161 that is displayed while being superimposed on the television program image 151 on the display screen of the display unit 106.

The detailed program information 181 is detailed information regarding a program selected from the current program guide 161 of the current program guide superimposition screen 141B.

Here, in a case where, for example, the down key 212 of the remote controller 20 is operated, as the operation OP17, by the user during the display of the detailed program information superimposition screen 141D, the current program guide superimposition screen 141B is displayed.

In this manner, in a case where the up key 211 is operated during the display of the current program guide superimposition screen 141B (operation OP16), a transition from the current program guide superimposition screen 141B to the detailed program information superimposition screen 141D is made. By contrast, in a case where the down key 212 is operated during the display of the detailed program information superimposition screen 141D (operation OP17), a transition from the detailed program information superimposition screen 141D to the current program guide superimposition screen 141B is made.

In other words, operating the up key 211 and the down key 212 of the cross button 202 of the remote controller 20 enables the transition between the current program guide superimposition screen 141B and the detailed program information superimposition screen 141D back and forth, in addition to the transition between the current program guide superimposition screen 141B and the program guide screen 141C back and forth as described above.

Note that, in a case where, for example, the user operates the detailed information key allocated to the button group 201 or the like of the remote controller 20 as the operation OP13 during the display of the television viewing screen 141A, the detailed program information superimposition screen 141D is directly displayed.

Here, information granularity and at-a-glance readability of each of the current program guide 161 on the current program guide superimposition screen 141B, the program guide 171 on the program guide screen 141C, and the detailed program information 181 on the detailed program information superimposition screen 141D are summarized as illustrated in FIG. 4, for example.

Specifically, in FIG. 4, the finest information granularity is information included in the detailed program information 181 (detailed information), the second finest one is information included in the current program guide 161 (somewhat detailed information), and the coarsest one is information included in the program guide 171 (coarse information). Further, the highest at-a-glance readability is the information included in the program guide 171 (full screen), the second highest one is the information included in the current program guide 161 (one row), and the lowest one is the information included in the detailed program information 181 (one). Note that the pieces of the information included in the current program guide 161, the program guide 171, and the detailed program information 181 are respectively represented as first information, second information, and third information in the present disclosure.

Thus, in the seamless UI to which the present technology is applied, when the transition between the current program guide superimposition screen 141B and the program guide screen 141C or the detailed program information superimposition screen 141D is seamlessly made back and forth in response to the user operating the up key 211 or the down key 212 of the cross button 202 of the remote controller 20, the information granularity and the at-a-glance readability are gradually and continuously changed on every screen with the transition of the screens (UI) being made upwardly and/or downwardly. Moreover, in order to show (produce) the states of these three screens in a seamless manner, the television program image 151 and the filter column 162 are shared between the respective screens in the seamless UI to which the present technology is applied.

Note that, for the allocation of the current program guide key, the program guide key, and the detailed information key to a button provided on the remote controller 20, the allocating of the down key 212 to the detailed information key or the allocation of the enter button 215 to the current program guide key, for example, enable the user to operate not only the information granularity after the menu screen is displayed but also the starting thereof with the cross button 202, on the screen while a television program is being viewed.

(Flow of Display Control Processing)

Figure 5:
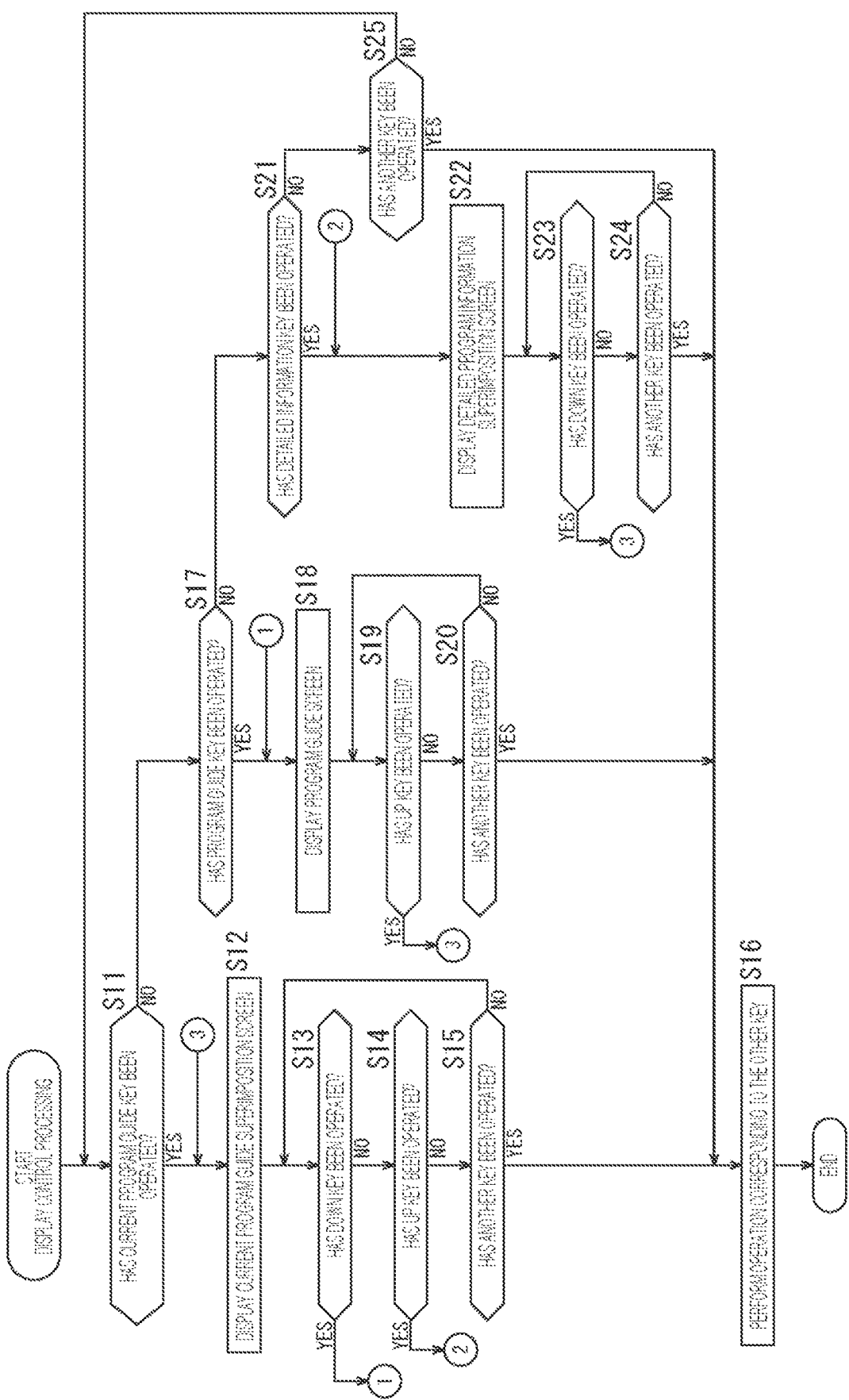
FIG. 5 is a flowchart explaining a flow of display control processing.

Next, the flow of display control processing which is performed by the display control device 10 will be described with reference to the flowchart in FIG. 5. Note that the display control processing in FIG. 5 illustrates the flow of processing in a case where the remote controller 20 is operated while the user is viewing a television program.

In step S11, the operation receiving unit 104 receives a signal from the remote controller 20 (e.g., wireless signal, infrared signal, etc.), and it is determined whether the current program guide key has been operated on the basis of a command corresponding to the received signal.

In step S11, in a case where it is determined that the current program guide key has been operated, the processing proceeds to step S12. In step S12, the display control unit 103 displays the current program guide superimposition screen 141B generated by the screen generation unit 105 on the display unit 106 (display screen of display unit 106). Note that a detailed description of the current program guide superimposition screen 141B will be described later with reference to FIG. 6.

It is determined whether the down key 212 or the up key 211 of the remote controller 20 has been operated during the display of the current program guide superimposition screen 141B (S13, S14). Here, in a case where it is determined that the down key 212 has been operated ("YES" in S13), the processing proceeds to step S18. On the other hand, in a case where it is determined that the up key 211 has been operated ("YES" in S14), the processing proceeds to step S22.

Further, in a case where it is determined that neither the up key 211 nor the down key 212 has been operated, the processing proceeds to step S15. In step S15, it is determined whether another key except the up key 211 and the down key 212 has been operated. In a case where it is determined that the other key has not been operated ("No" in S15), since no key is operated, the processing returns to step S13, and the processing from step S13 to step S15 is repeatedly performed until any key is operated.

Then, in a case where the other key has been operated ("YES" in S15), the processing proceeds to step S16. In step S16, the display control device 10 performs an operation corresponding to the other key.

On the other hand, in a case where it is determined in step S11 that the current program guide key has not been operated, the processing proceeds to step S17.

In step S17, it is determined whether the program guide key has been operated. In step S17, in a case where it is determined that the program guide key has been operated, the processing proceeds to step S18. In step S18, the display control unit 103 displays the program guide screen 141C generated by the screen generation unit 105 on the display unit 106 (display screen of display unit 106). Note that a detailed description of the program guide screen 141C will be described later with reference to FIG. 7.

Here, in addition to the case where the program guide key has been operated ("YES" in S17), in a case where the down key 212 has been operated during the display of the current program guide superimposition screen 141B ("YES" in S13), the display is switched from the current program guide superimposition screen 141B to the program guide screen 141C (S18).

During the display of the program guide screen 141C, it is determined whether the up key 211 of the remote controller 20 has been operated (S19). Here, in case where it is determined that the up key 211 has been operated ("YES" in S19), the display is switched from the program guide screen 141C to the current program guide superimposition screen 141B (S12).

Further, in a case where it is determined that the up key 211 has not been operated, the processing proceeds to step S20. In step S20, it is determined whether another key except the up key 211 has been operated. In a case where it is determined that the other key has not been operated ("NO" in S20), the processing returns to step S19, and the processing from step S19 to step S20 is repeated. Then, in a case where it is determined that the other key has been operated ("YES" in S20), the display control device 10 performs an operation corresponding to the other key (S16).

On the other hand, in a case where it is determined in step S17 that the program guide key has not been operated, the processing proceeds to step S21.

In step S21, it is determined whether the detailed information key has been operated. In step S21, in a case where it is determined that the detailed information key has been operated, the processing proceeds to step S22. In step S22, the display control unit 103 displays the detailed program information superimposition screen 141D generated by the screen generation unit 105 on the display unit 106 (display screen of display unit 106). Note that a detailed description of the detailed program information superimposition screen 141D will be described later with reference to FIG. 9.

Here, in addition to the case where the detailed information key has been operated ("YES" in S21), in a case where the up key 211 has been operated during the display of the current program guide superimposition screen 141B ("YES" in S14), the display is switched from the current program guide superimposition screen 141B to the detailed program information superimposition screen 141D (S22).

During the display of the detailed program information superimposition screen 141D, it is determined whether the down key 212 of the remote controller 20 has been operated (S23). Here, in case where it is determined that the down key 212 has been operated ("YES" in S23), the display is switched from the detailed program information superimposition screen 141D to the current program guide superimposition screen 141B (S12).

Further, in a case where it is determined that the down key 212 has not been operated, the processing proceeds to step S24. In step S24, it is determined whether another key except the down key 212 has been operated. In a case where it is determined that the other key has not been operated ("NO" in S24), the processing returns to step S23, and the processing from step S23 to step S24 is repeated. Then, in a case where it is determined that the other key has been operated ("YES" in S24), the display control device 10 performs an operation corresponding to the other key (S16).

Note that, in a case where it is determined that the detailed information key has not been operated in step S21, the processing proceeds to step S25. In step S25, in a case where it is determined that the other key has been operated ("YES" in S25), the display control device 10 performs an operation corresponding to the other key (S16). On the other hand, in a case where it is determined that the other key has not been operated ("NO" in S25), the processing returns to S11, and the processing subsequent thereto is repeated.

The flow of the display control processing has been described hereinbefore. In this display control processing, the display control unit 103 performs a seamless screen transition between the current program guide superimposition screen 141B and the program guide screen 141C and between the current program guide superimposition screen 141B and the detailed program information superimposition screen 141D, in response to the display control of the screen corresponding to an operation performed on the remote controller 20 by the user.

Here, FIG. 6 to FIG. 9 each illustrate a display example of a screen which is displayed in the foregoing display control processing (FIG. 5).

(Example of Current Program Guide Superimposition Screen)

Figure 6:
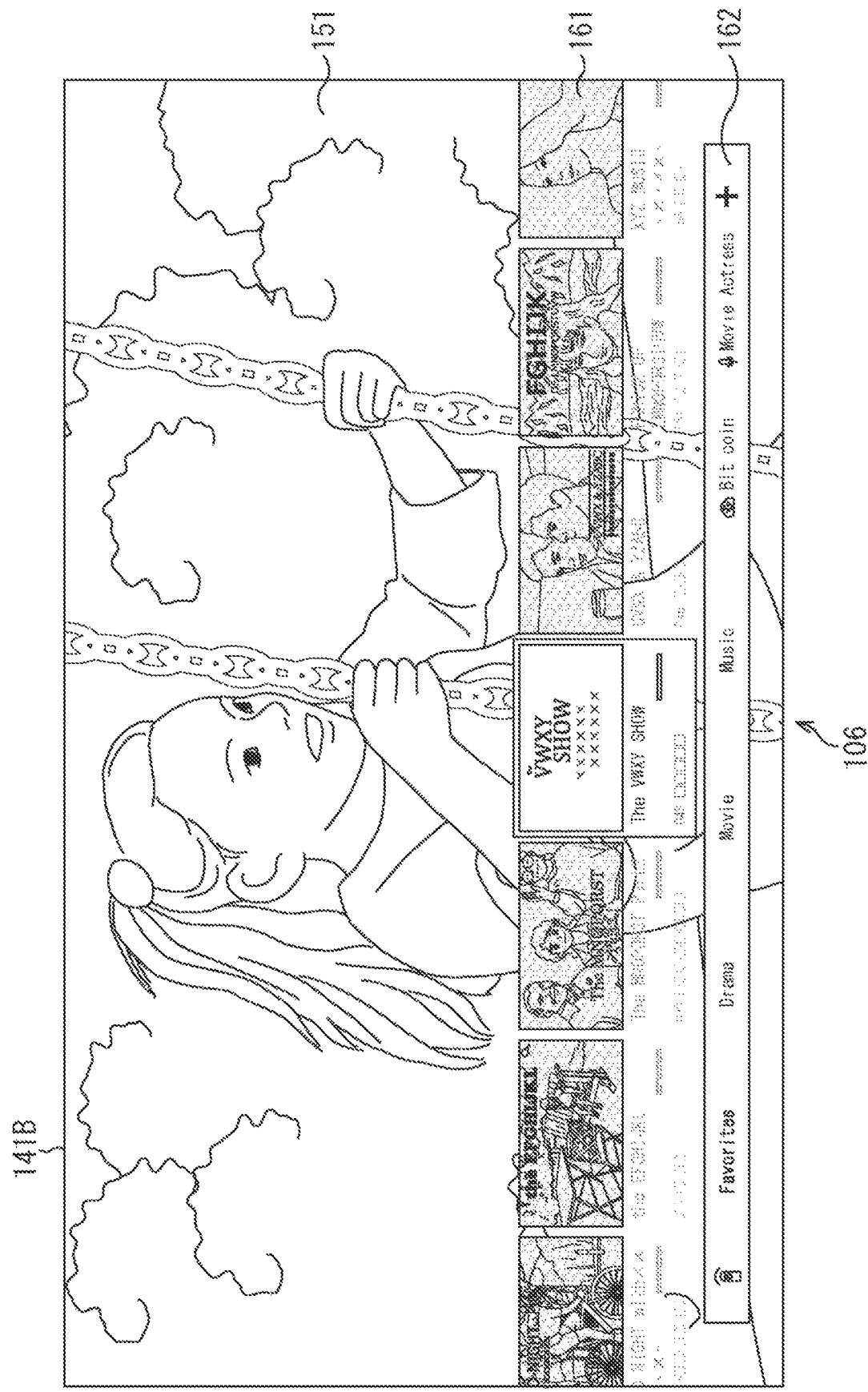
FIG. 6 is a diagram illustrating a display example of a current program guide superimposition screen.

FIG. 6 illustrates a display example of the current program guide superimposition screen 141B which is displayed in the processing in step S12 of FIG. 5.

On the current program guide superimposition screen 141B in FIG. 6, a current program guide 161 and a filter column 162 are displayed while being superimposed on a lower area (half screen) of the television program image 151 displayed on the entire display screen of the display unit 106.

In the example of FIG. 6, pieces of information regarding a plurality of programs are horizontally aligned and displayed in the current program guide 161, as information regarding programs on other channels (programs in the same time slot on different channels). Here, a piece of information regarding each program includes information such as a thumbnail image, a title, and time. The piece of information regarding each program is selected by the left key 213 or the right key 214 of the remote controller 20 being operated. The example of FIG. 6 illustrates a state where the fourth piece of information from the left is selected.

Further, the filter column 162 includes "Favorites", "Drama", "Movie", and "Music" as filters. In the example of FIG. 6, the "Favorites" is selected from among a plurality of filters. Note that the filters illustrated here are merely an example, and may include, for example, sport, soccer, and a team name. Moreover, the filters can include various types of information, such as programs that the user has viewed last week, and programs that a specific person (e.g., a celebrity) has viewed.

Note that information corresponding to a selected filter may be displayed in addition to the information regarding the programs on other channels, as the current program guide 161. For example, since the "Favorites" is selected in the filter column 162 in the example of FIG. 6, information regarding the program that the user has registered as the "Favorites" can also be displayed in the current program guide 161.

The current program guide superimposition screen 141B (FIG. 6) is displayed in a case where the current program guide key has been operated ("YES" in S11 of FIG. 5), in a case where the up key 211 has been operated during the display of the program guide screen 141C (FIG. 7) ("YES" in S19 of FIG. 5), or in a case where the down key 212 is operated during the display of the detailed program information superimposition screen 141D (FIG. 9) ("YES" in S23 of FIG. 5).

Further, during the display of the current program guide superimposition screen 141B (FIG. 6), the program guide screen 141C (FIG. 7) is displayed in a case where the down key 212 is operated ("YES" in S13 of FIG. 5), and the detailed program information superimposition screen 141D (FIG. 9) is displayed in a case where the up key 211 is operated ("YES" in S14 in FIG. 5).

(Example of Program Guide Screen)

Figure 7:
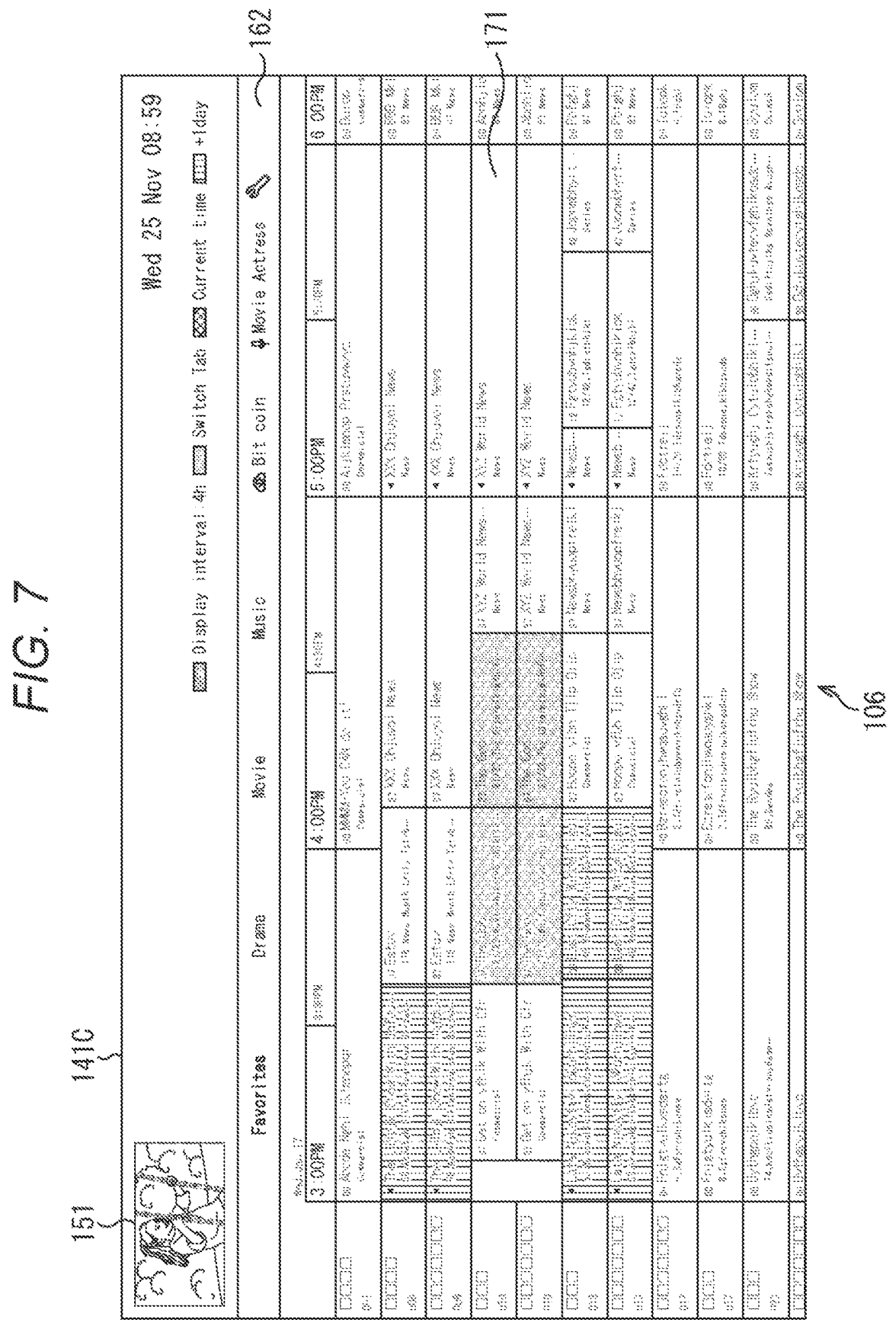

FIG. 7 illustrates a display example of the program guide screen 141C which is displayed in the processing in step S18 of FIG. 5.

On the program guide screen 141C of FIG. 7, the program guide 171 is displayed on the entire display screen (full screen) of the display unit 106, and the filter column 162 and the television program image 151 (reduced-size image) in a sub screen are displayed in an upper area of the program guide screen 141C.

Figure 8:
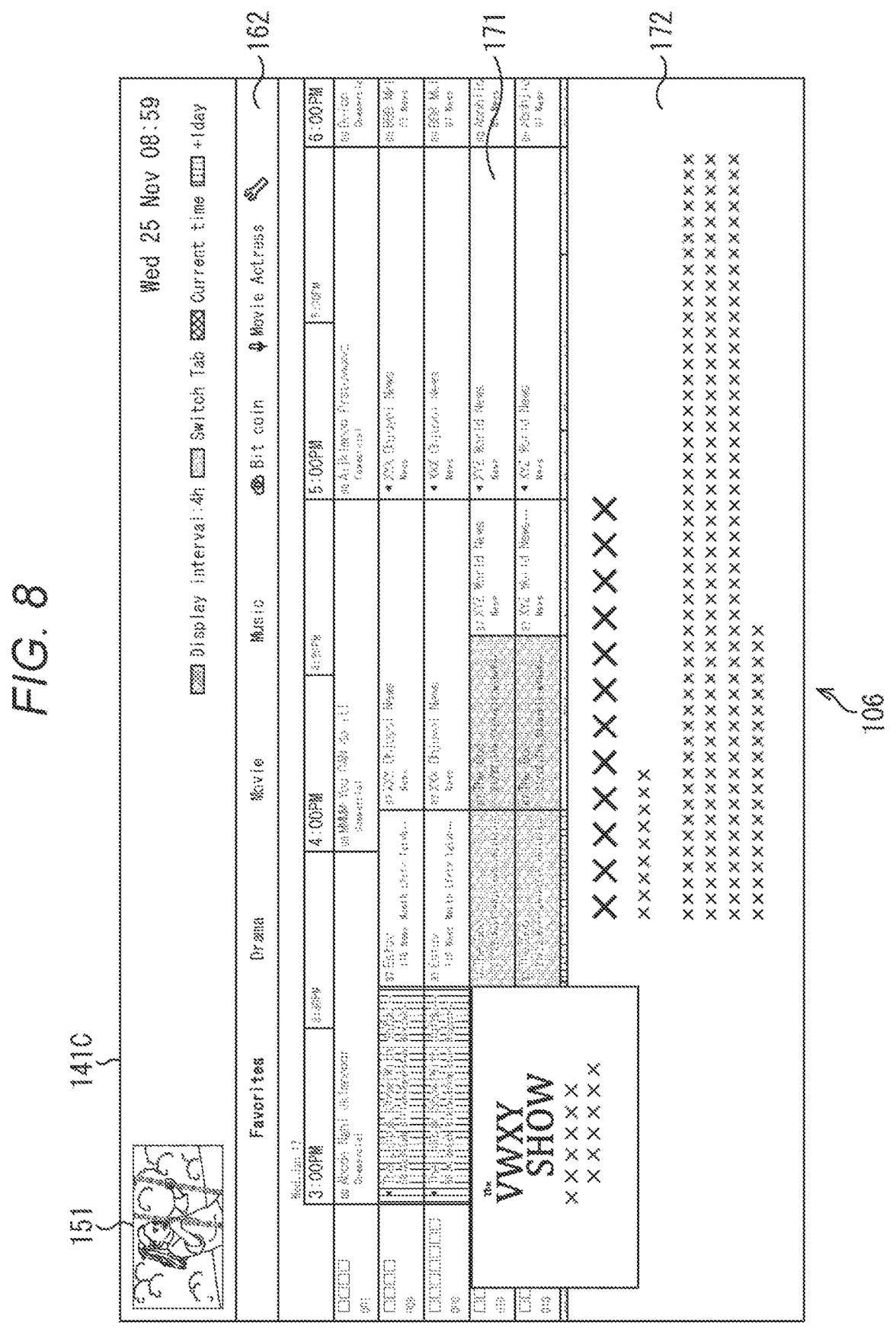

In the example in FIG. 7, the program guide 171 displays information in which the broadcast schedule of television programs is organized in a table on the basis of channels (broadcasting stations) and broadcasting time. Here, a piece of information regarding each program includes, for example, information regarding the title and the like. The piece of information regarding each program is selected by, for example, respective four direction keys of the cross button 202 of the remote controller 20 being operated. Here, in a case where, for example, information regarding a desired program is selected and a predetermined operation is performed, detailed information regarding the selected program is displayed (FIG. 8).

Further, the filter column 162 in the example of FIG. 7 is provided in correspondence with the filter column 162 of the current program guide superimposition screen 141B (FIG. 6), and includes "Favorites", "Drama", "Movie", and "Music" as filters. In the example of FIG. 7, the "Favorites" is selected from among a plurality of filters. The use of these filters enables a desired television program to be narrowed in the program guide 171.

In the example in FIG. 7, the television program image 151 is displayed in a sub screen in an upper left area. This sub-screen display corresponds to the television program image 151 that is displayed in full screen in the current program guide superimposition screen 141B (FIG. 6).

The program guide screen 141C (FIG. 7) is displayed in a case where the program guide key is operated ("YES" in S17 of FIG. 5) or in a case where the down key 212 is operated during the display of the current program guide superimposition screen 141B (FIG. 6) ("YES" in S13 of FIG. 5). Further, the current program guide superimposition screen 141B (FIG. 6) is displayed in a case where the up key 211 is operated on the program guide screen 141C (FIG. 7) ("YES" in S19 of FIG. 5)

(Example of Detailed Program Information Screen)

Figure 9:
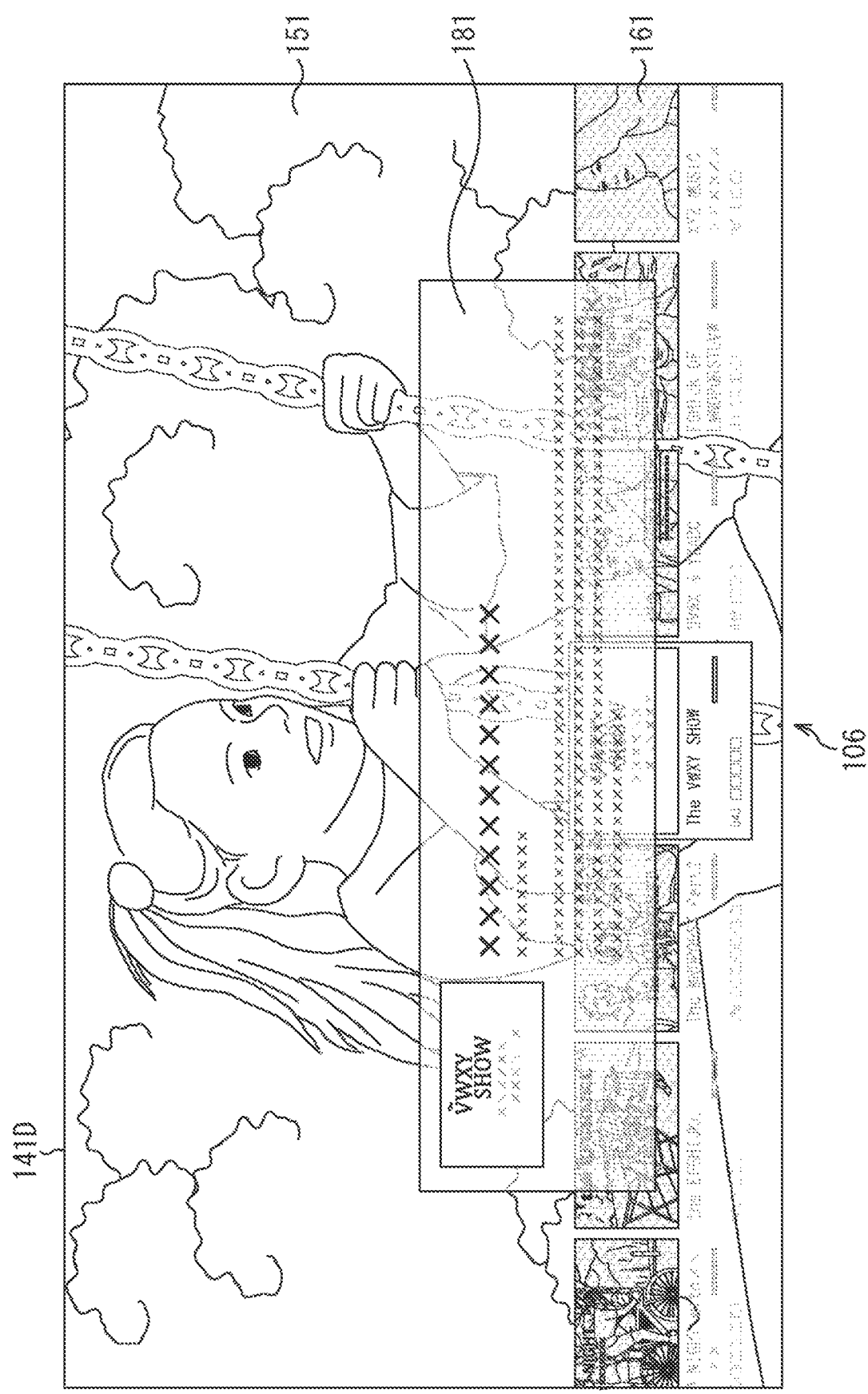
FIG. 9 is a diagram illustrating a display example of a detailed program information superimposition screen.

FIG. 9 illustrates a display example of the detailed program information superimposition screen 141D which is displayed in the processing in S22 of FIG. 5.

On the detailed program information superimposition screen 141D of FIG. 9, the detailed program information 181 is displayed while being superimposed on the current program guide 161 that is displayed while being superimposed on a lower area of the television program image 151 displayed on the entire display screen of the display unit 106.

In the example of FIG. 9, the detailed program information 181 includes information such as a thumbnail image, a title, and an overview of program content, as information regarding a program selected from the current program guide 161 of the current program guide superimposition screen 141B.

The detailed program information superimposition screen 141D (FIG. 9) is displayed in a case where the detailed information key is operated ("YES" in S21 of FIG. 5) or in a case where the up key 211 is operated during the display of the current program guide superimposition screen 141B (FIG. 6) ("YES" in S14 of FIG. 5). Further, the current program guide superimposition screen 141B (FIG. 6) is displayed in a case where the down key 212 is operated on the detailed program information superimposition screen 141D (FIG. 9) ("YES" in S23 of FIG. 5)

As described above, the filter column 162 is shared between the current program guide superimposition screen 141B (FIG. 6) and the program guide screen 141C (FIG. 7) in order to make the transition between the current program guide superimposition screen 141B (FIG. 6) and the program guide screen 141C (FIG. 7) or the detailed program information superimposition screen 141D (FIG. 9) appear seamless.

Further, while the television program image 151 is displayed on the entire display screen in the current program guide superimposition screen 141B (FIG. 6) and the detailed program information superimposition screen 141D (FIG. 9), the television program image 151 is displayed in the sub screen in the program guide screen 141C (FIG. 7), thus sharing the television program image 151. This makes the transition between the three screens appear seamless.

Moreover, the information granularity and the at-a-glance readability are gradually and continuously changed between the program guide screen 141C (FIG. 7), the current program guide superimposition screen 141B (FIG. 6), and the detailed program information superimposition screen 141D (FIG. 9), thus making the transition between the three screens appear seamless.

This arrangement can give the user an impression of the three different screens (menu screens), namely, the current program guide superimposition screen 141B (FIG. 6), the program guide screen 141C (FIG. 7), and the detailed program information superimposition screen 141D (FIG. 9), being one connected screen (menu screen), thus improving the operability compared with a case where each screen (menu screen) is individually operated. In particular, the transition between the three screens is enabled only with the operation on the cross button 202 (up key 211, down key 212) when a user operates the remote controller 20.

Moreover, in typical television receivers, a transition between two menu screens, namely, a program guide displayed while a television program is being viewed (current program guide) and a program guide displayed in full screen, is switched by an individual function call key of a remote controller being operated, so that a seamless transition in response to a cursor movement in accordance with an operation on a cross button has been demanded. The seamless UI to which the present technology is applied can respond to this demand.

More specifically, although a user who uses the typical television receivers cannot perform the operation of switching the display of the menu screens without looking at the remote controller to search for a function key, the seamless UI to which the present technology is applied enables the switching of the display of the menu screens to change the information granularity and the at-a-glance readability only with the cross button 202 of the remote controller 20. Accordingly, the user can easily perform the operation without looking at the remote controller 20. Moreover, the seamless UI to which the present technology is applied makes the transition of the menu screens seamless, which reduces a possibility that the user will be confused about the next operation in the menu screen.

2. Second Exemplary Embodiment

In the first exemplary embodiment described above, while the seamless UI in viewing a television program has been described, the seamless UI is not limited to when a television program is being viewed, but is also applicable to when, for example, content, such as a program distributed via the Internet, a recorded program, and a program stored in a storage medium is being reproduced.

More specifically, other content in addition to broadcast content, such as a television program, is also input to the signal input unit 101 in the display control device 10. Examples of the other content include, for example, communication content distributed from a content distribution site (Internet content), recorded content recorded by a recorder, and storage content stored in a storage medium, such as a semiconductor memory. In reproducing and displaying such content on the display unit 106, the seamless UI is applicable as well.

Moreover, for the seamless UI in a case where the Internet content is reproduced to be viewed, a recommended content guide superimposition screen and a recommended content guide are displayed in correspondence with the current program guide superimposition screens 141B and the current program guides 161 illustrated in FIG. 3 and FIG. 6, respectively. In the recommended content guide, pieces of the content that have been selected by the content distribution site are lined up, while, in the recommended content guide superimposition screen, a filter column is displayed together with this recommended content guide. Note that the recommended content guide may be based on the user's history and taste. Moreover, in contrast to the program guide screens 141C illustrated in FIG. 3 and FIG. 7, a content table, the filter column, and a content reproduced image (sub screen) are displayed in correspondence with the program guide 171, the filter column 162, and the television program image 151 (sub screen), respectively.

(Another Example of Seamless UI)

Figure 10:
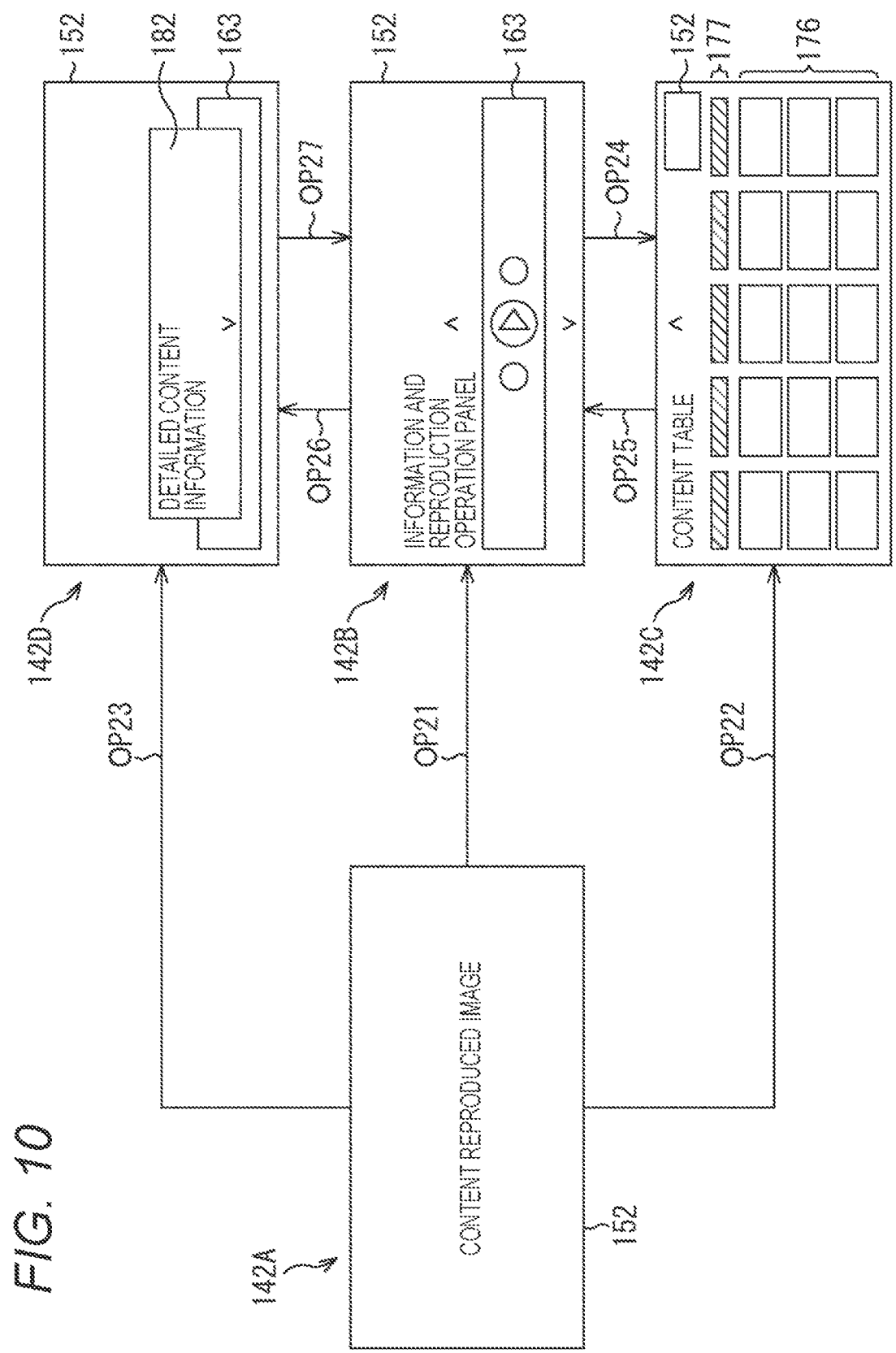
FIG. 10 is a diagram illustrating an example of a seamless UI in a case where recorded and/or stored content is reproduced and viewed.

FIG. 10 illustrates an example of a seamless UI in a case where recorded and/or stored content is reproduced and viewed.

FIG. 10 illustrates a display example of a transition of screens when respective operations from an operation OP21 to an operation OP27, which are each a user operation performed on the remote controller 20, are performed in a case where the display screen of the display unit 106 in the display control device 10 displays a content reproduced screen 142A, an information and reproduction operation panel superimposition screen 142B, a content table screen 142C, or a detailed content information superimposition screen 142D.

Here, in a case where, for example, the user holding the remote controller 20 operates any key as the operation OP21 during the display of the content reproduced screen 142A, which displays a content reproduced image 152, the information and reproduction operation panel superimposition screen 142B is displayed.

On this information and reproduction operation panel superimposition screen 142B, the information and reproduction operation panel 163 is displayed while being superimposed on a lower area of the content reproduced image 152 displayed on the entire display screen of the display unit 106. The information and reproduction operation panel 163 is an area in which buttons each corresponding to respective functions, such as reproduction, pause, fast-forward, and fast-reverse, are displayed.

Here, in a case where, for example, the down key 212 of the remote controller 20 is operated, as the operation OP24, by the user during the display of the information and reproduction operation panel superimposition screen 142B, the content table screen 142C is displayed.

On this content table screen 142C, a content table 176 is displayed on the entire display screen of the display unit 106, and a filter column 177 is displayed on an upper area thereof. Further, on the content table screen 142C, the content reproduced image 152 is displayed in a sub screen on an upper right area.

The content table 176 is an area displaying information regarding content recorded or stored, in a predetermined display format. The filter column 177 is an area including information regarding filters.

Here, in a case where, for example, the user operates the up key 211 of the remote controller 20 as the operation OP25 during the display of the content table screen 142C, the information and reproduction operation panel superimposition screen 142B is displayed.

In this manner, in a case where the down key 212 is operated during the display of the information and reproduction operation panel superimposition screen 142B (operation OP24), a transition from the information and reproduction operation panel superimposition screen 142B to the content table screen 142C is made. By contrast, in a case where the up key 211 is operated during the display of the content table screen 142C (operation OP25), a transition from the content table screen 142C to the information and reproduction operation panel superimposition screen 142B is made. In other words, operating the up key 211 and the down key 212 of the cross button 202 of the remote controller 20 enables the transition between the information and reproduction operation panel superimposition screen 142B and the content table screen 142C back and forth.

Note that, in a case where, for example, the user operates the recorded list key allocated to the button group 201 or the like of the remote controller 20 as the operation OP22 during the display of the content reproduced screen 142A, the content table screen 142C is directly displayed.

On the other hand, in a case where, for example, the up key 211 of the remote controller 20 is operated, as the operation OP26, by the user during the display of the information and reproduction operation panel superimposition screen 142B, the detailed content information superimposition screen 142D is displayed.

On this detailed content information superimposition screen 142D, detailed content information 182 is displayed while being superimposed on the information and reproduction operation panel 163 which is displayed while being superimposed on the content reproduced image 152 on the display screen of the display unit 106.

The detailed content information 182 is detailed information regarding the content that is being reproduced.

Here, in a case where, for example, the user operates the down key 212 of the remote controller 20 as the operation OP27 during the detailed content information superimposition screen 142D, the information and reproduction operation panel superimposition screen 142B is displayed.

In this manner, in a case where the up key 211 is operated during the display of the information and reproduction operation panel superimposition screen 142B (operation OP26), a transition from the information and reproduction operation panel superimposition screen 142B to the detailed content information superimposition screen 142D is made. By contrast, in a case where the down key 212 is operated during the display of the detailed content information superimposition screen 142D (operation OP27), a transition from the detailed content information superimposition screen 142D to the information and reproduction operation panel superimposition screen 142B is made.

Note that, in a case where, for example, the user operates the detailed information key allocated to the button group 201 or the like of the remote controller 20 as the operation OP23 during the display of the content reproduced screen 142A, the detailed content information superimposition screen 142D is directly displayed.

Here, the information granularity and the at-a-glance readability of each of the information and reproduction operation panel 163 on the information and reproduction operation panel superimposition screen 142B, the content table 176 on the content table screen 142C, and the detailed content information 182 on the detailed content information superimposition screen 142D are summarized as illustrated in FIG. 11, for example.

Specifically, in FIG. 11, the finest information granularity is information included in the detailed content information 182 (detailed information), the second finest one is information included in the information and reproduction operation panel 163 (somewhat detailed information), and the coarsest one is information included in the content table 176 (coarse information). Further, the highest at-a-glance readability is the information included in the content table 176 (full screen), the second highest one is the information included in the information and reproduction operation panel 163 (one row), and the lowest one is the information included in the detailed content information 182 (one).

Thus, in the seamless UI to which the present technology is applied, when the transition between the information and reproduction operation panel superimposition screen 142B and the content table screen 142C or the detailed content information superimposition screen 142D is seamlessly made back and forth in response to the user operating the up key 211 or the down key 212 of the cross button 202, the information granularity and the at-a-glance readability are gradually and continuously changed on every screen. Moreover, in order to show (in order to produce) the states of these three screens in a seamless manner, the content reproduced image 152 and the like are shared between the respective screens in the seamless UI to which the present technology is applied.

Additionally, the seamless UI during the reproduction of such content is common to the seamless UI in the viewing of the television program as described above, thus enabling commonality of usability for the user regardless of a mode in which the user views content (viewing type).

Figure 12:
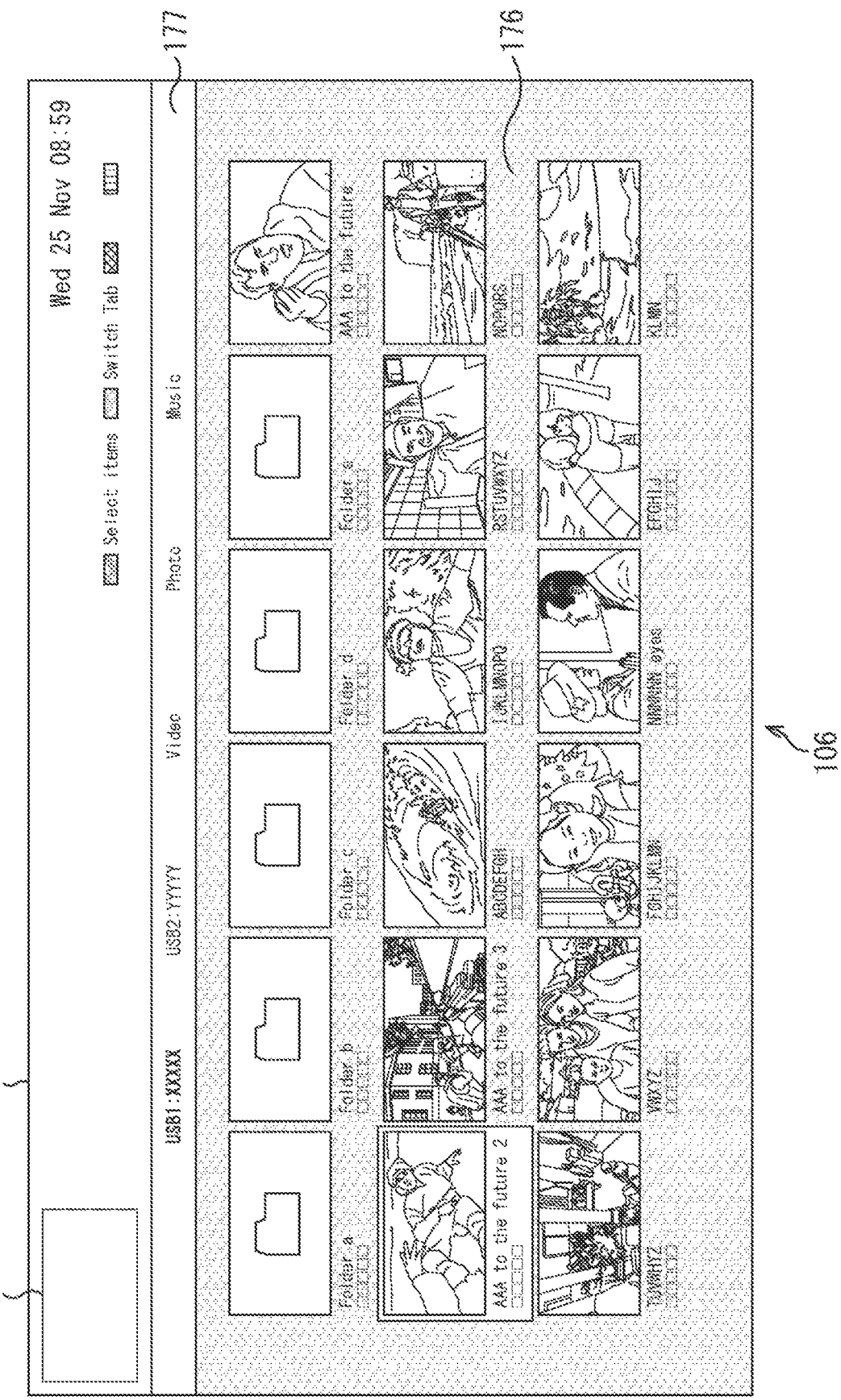
FIG. 12 is a diagram illustrating a display example of a content table screen.

For example, FIG. 12 illustrates a display example of the content table screen 142C of the seamless UI during the reproduction of content. In the content table screen 142C of FIG. 12, the content table 176, the filter column 177, and the content reproduced image 152 (sub screen) are displayed in correspondence with the program guide 171, the filter column 162, and the television program image 151 (sub screen), respectively, in comparison with the program guide screen 141C of FIG. 7.

Further, FIG. 13 illustrates a bird's-eye image of the seamless UI. In a case where the viewing type include, for example, television broadcasting (including a set-top box [STB] input), recording (including USB, HDD, Digital Transmission Content Protection [DTCP]-IP), USB, Digital Living Network Alliance ([DLNA], registered trademark) as illustrated in FIG. 13, making the transition of screens within each viewing type seamless enables users with the provision of secure operability with easy behavior prediction. Furthermore, the providing of commonality of the operability and a screen design for each viewing type enable the provision of secure operability with little learning.

3. Variation

In the foregoing description, while the display control device 10 has been described to be the television receiver, but is not limited thereto. The display control device 10 may be an electronic apparatus, such as a display device, a personal computer, a tablet terminal, a smart phone, a portable telephone, a head-mounted display, and a game machine.

Further, in the foregoing description, while the display control device 10 has been described to be the television receiver including the display unit 106, such as a crystal liquid display unit and an OLED display unit, but the display control device to which the present technology is applied may have a configuration without a display unit.

(Configuration of Display System)

Figure 14:
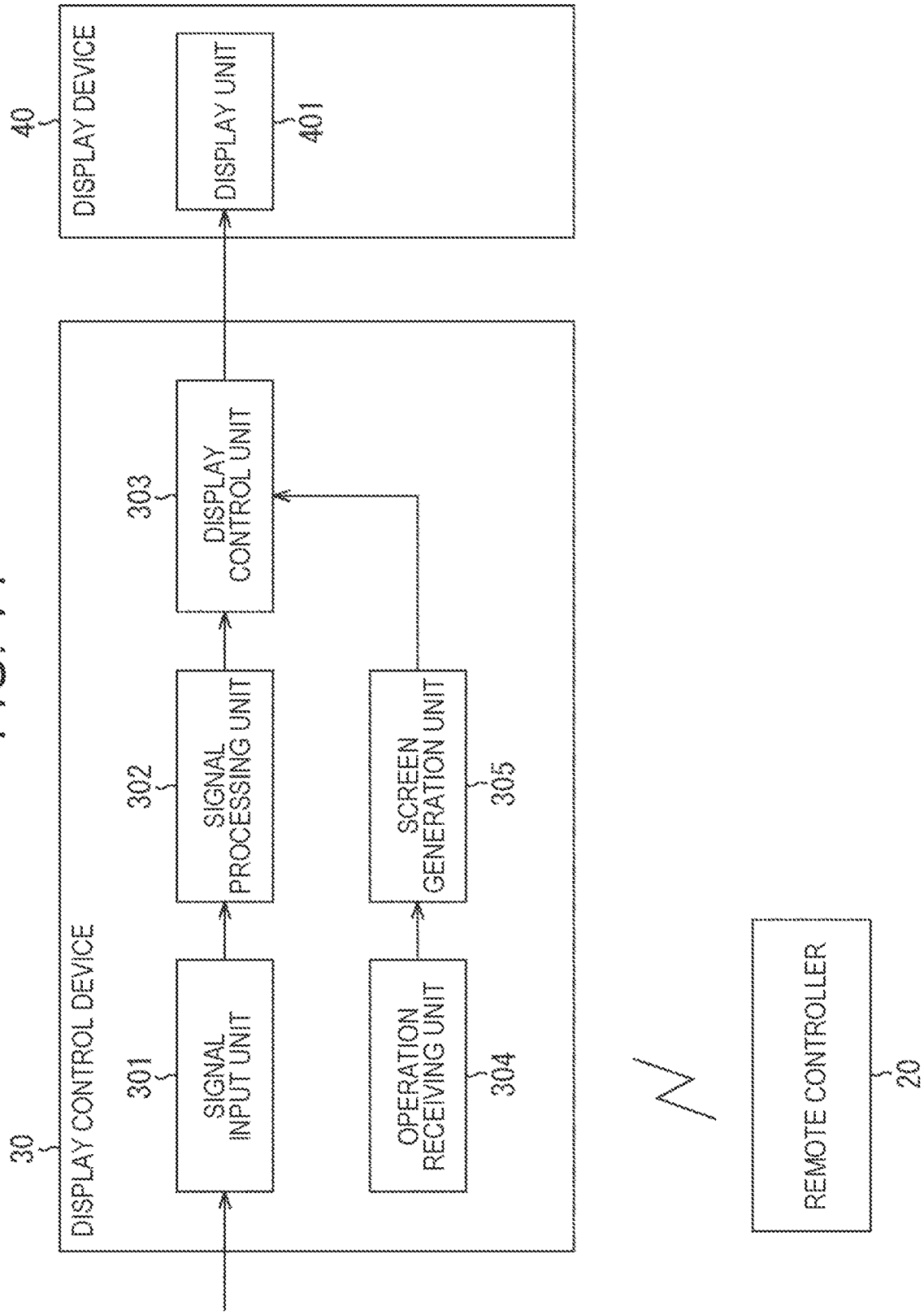
FIG. 14 is a block diagram illustrating an example of a configuration of an embodiment of a display system to which the present technology is applied.

FIG. 14 is a block diagram illustrating an example of a configuration of an exemplary embodiment of a display system to which the present technology is applied.

The display system in FIG. 14 includes a display control device 30 and a display device 40. The display control device 30 is an electronic apparatus such as a set-top box, a recorder, and a reproducer (player). Further, the display device 40 is an electronic apparatus such as a display device, a television receiver, a tablet terminal, and a personal computer. The display control device 30 and the display device 40 are connected by a cable and the like via an interface compliant with a predetermined standard.

In FIG. 14, the display control device 30 includes a signal input unit 301, a signal processing unit 302, a display control unit 303, an operation receiving unit 304, and a screen generation unit 305. Further, in FIG. 14, the display device 40 includes a display unit 401.

The signal input unit 301 to the screen generation unit 305 and the display unit 401 in FIG. 14 are configured in a manner similar to the signal input unit 101 to the screen generation unit 105 and the display unit 106 in FIG. 1, respectively. In other words, in the display system in FIG. 14, the display control device 30 on the display control device 30 side controls images and various types of screens to be displayed on the display screen of the display unit 401 on the display device 40 side.

Note that, while the display control device 30 and the display device 40 have been described to be connected via a predetermined interface, such as a cable, in FIG. 14, the display control device 30 and the display device 40 here may be connected, not only by wire but also by, for example, an exchange of image signals in accordance with a communication method compliant with a predetermined standard. Further, the "system" means a set of a plurality of constituent elements (device, module [component], etc.), and not all the constituent elements may be contained in the same housing.

Furthermore, the operations performed on the display control device 10 and the display control device 30 have been described to be performed by the user operating the remote controller 20 in the foregoing description, but this is not restrictive. For example, a voice operation, a gesture operation, and the like may be performed in accordance with an utterance, a gesture, and the like of the user. Moreover, the display control device 10 (or display control device 30) and the remote controller 20 may communicate, not only over a short-range wireless communication and an infrared communication, but may also communicate in accordance with other communication methods. The communication method herein is not limited to wireless communication, and may be wired communication.

4. Configuration of Computer

Figure 15:
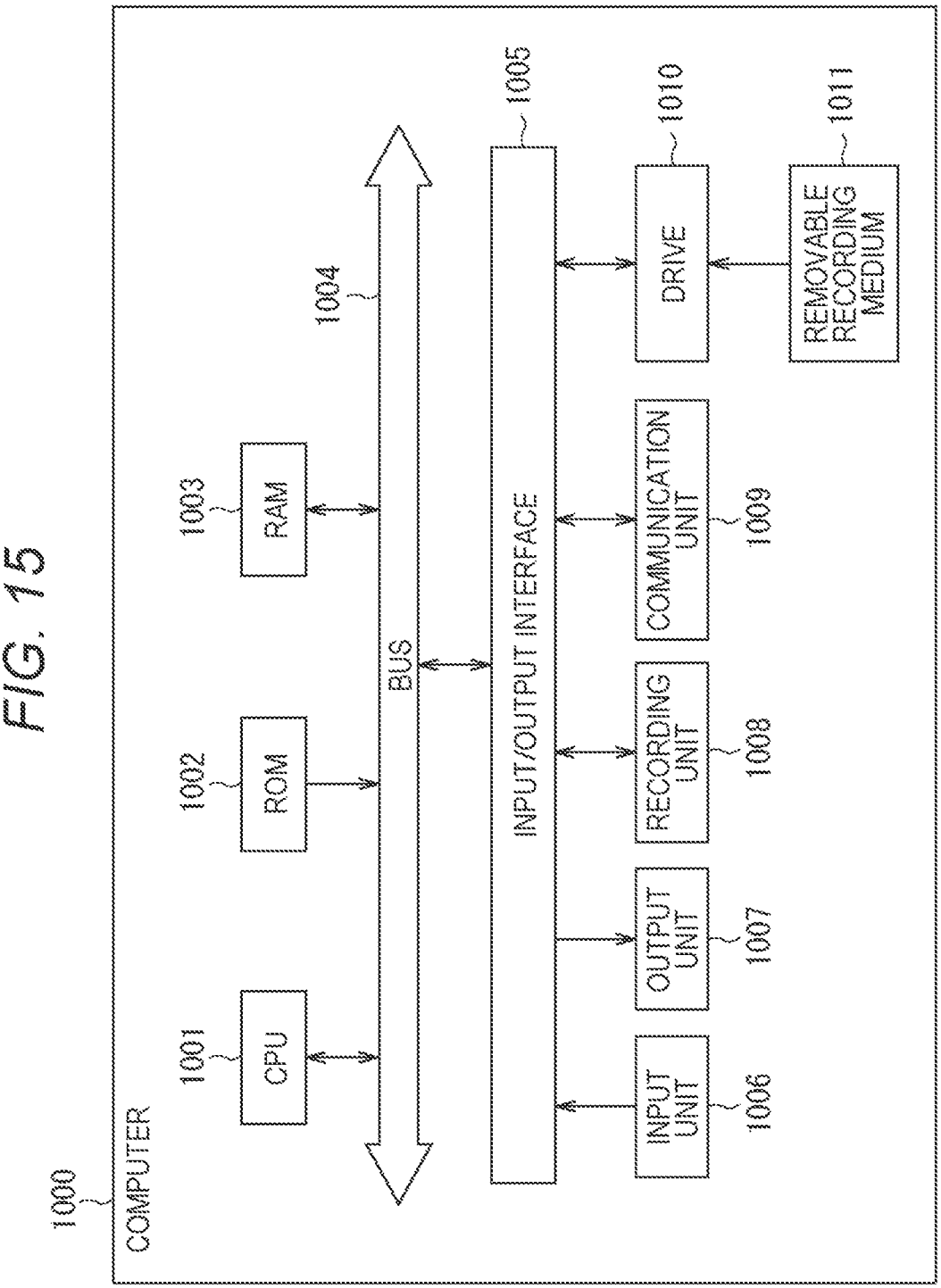
FIG. 15 is a diagram illustrating an example of a configuration of a computer.

A series of processes described above (the display control processes illustrated in FIG. 5) can be executed by hardware or software. If a series of processes is executed by software, a program constituting the software is installed in a computer of each device. FIG. 15 is a block diagram illustrating an exemplary hardware configuration of a computer that executes a series of processing described above by a program.

In this computer 1000, a central processing unit (CPU) 1001, a read only memory (ROM) 1002, and a random access memory (RAM) 1003 are connected to one another by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a microphone, a keyboard, a mouse, or the like. The output unit 1007 includes a speaker, a display, or the like. The recording unit 1008 includes a hard disk, a nonvolatile memory, or the like. The communication unit 1009 includes a network interface or the like. The drive 1010 drives a removable recording medium 1011 such as a magnetic disk, an optical disk, a magneto-optical disk, or a semiconductor memory.

In the computer 1000 configured as described above, the CPU 1001 loads a program that is recorded, for example, in the ROM 1002 or the recording unit 1008 onto the RAM 1003 via the input/output interface 1005 and the bus 1004, and executes the program. Thus, the above-described series of processing is performed.

Programs to be executed by the computer 1000 (the CPU 1001) are provided being recorded in the removable recording medium 1011 which is a packaged medium or the like, for example. Also, programs may be provided via a wired or wireless transmission medium, such as a local area network, the Internet or digital satellite broadcasting.

In the computer 1000, the program can be installed on the recording unit 1008 via the input/output interface 1005 by mounting the removable recording medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Furthermore, the above-mentioned steps shown in the flowcharts can be executed by a single device or can be cooperatively executed by a plurality of devices. Furthermore, in the case where a plurality of processes is included in a single step, the plurality of processes included in the single step can be executed by a single device or can be cooperatively executed by a plurality of devices.

Moreover, embodiments of the present technology are not limited to the above embodiment, and various kinds of modification can be performed within the scope of the present technology. In one example, the present technology can employ cloud-computing configuration in which a single function is shared by a plurality of devices via a network and is cooperatively processed by the plurality of devices.

Additionally, the present technology may also be configured as below.

(1)

A display control device including
a display control unit configured to perform control to:
display filter information regarding a filter and first information regarding content in a first area of a display screen; and
display, in a case where a user performs a first operation, the filter information and second information regarding the content in a second area of the display screen, the second area being greater than the first area.

(2)

The display control device according to (1),
in which the first information includes information regarding content corresponding to the filter, and
the second information includes information regarding content corresponding to the filter.

(3)

The display control device according to (1) or (2),
in which the display control unit
displays the first information in an upper area in the first area and displays the filter information in a lower area in the first area, and
switches, in a case where an operation corresponding to a downward direction is performed as the first operation, a display from the filter information and the first information displayed in the first area to the filter information and the second information displayed in the second area.

(4)
The display control device according to (3),
in which the display control unit displays the filter information and the first information which are superimposed on the first area corresponding to part of an image of content displayed on the display screen.

(5)
The display control device according to (3),
in which the display control unit displays, in the second area, a reduced-size image obtained by reducing in size an image of content together with the filter information and the second information.

(6)
The display control device according to any one of (1) to (5),
in which the second information includes information with coarse information granularity compared with the first information.

(7)
The display control device according to any one of (1) to (6),
in which the second information includes information with high at-a-glance readability compared with the first information.

(8)
The display control device according to (3),
in which the display control unit
displays the filter information in an upper area in the second area and displays the second information in a lower area in the second area, and
switches, in a case where an operation corresponding to an upward direction is performed by the user as a second operation different from the first operation, the display from the filter information and the second information displayed in the second area to the filter information and the first information displayed in the first area.

(9)
The display control device according to any one of (1) to (8),
in which, in a case where a second operation different from the first operation is performed by the user, the display control unit displays third information regarding content corresponding to the first information in a third area different from the first area and the second area.

(10)
The display control device according to (9),
in which, in a case where an operation corresponding to an upward direction is performed as the second operation, the display control unit displays the third information superimposed on at least part of the first information displayed in the first area, the third information being displayed in the third area.

(11)
The display control device according to (9) or (10),
in which the third information includes information with finer information granularity compared with the first information and the second information.

(12)
The display control device according to any one of (9) to (11),
in which the third information includes information with low at-a-glance readability compared with the first information and the second information.

(13)
The display control device according to (10)
in which, in a case where an operation corresponding to a downward direction is performed as the first operation, the display control unit switches a display from the third information displayed in the third area to the filter information and the first information displayed in the first area.

(14)
The display control device according to any one of (1) to (13),
in which the first area includes a lower area that is substantially half an entire area of the display screen,
the second area includes an area corresponding to the entire area of the display screen, and
the display control unit displays the filter information displayed in the first area and the filter information displayed in the second area at a position indicating that the first information displayed in the first area and the second information displayed in the second area are relevant.

(15)
The display control device according to any one of (1) to (14),
in which the first information includes information regarding content corresponding to a selection filter selected from among a plurality of the filters, and
the second information includes information regarding the content corresponding to the selection filter.

(16)
The display control device according to any one of (9) to (13),
in which the third information includes information regarding selection content selected from among a plurality of pieces of content corresponding to the first information.

(17)
The display control device according to any one of (8) to (10), and (13),
in which the first operation and the second operation each include an operation on a cross button provided on a remote controller.

(18)
The display control device according to any one of (1) to (17),
in which the content includes broadcast content, and
the display control device is configured as a television receiver further including a display unit including the display screen.

(19)
A display control method performed by a display control device, the method including:
displaying filter information regarding a filter and first information regarding content in a first area of a display screen; and
displaying, in a case where a user performs a first operation, the filter information and second information regarding the content in a second area of the display screen, the second area being greater than the first area.

(20)
A program for causing a computer to function as a display control unit that performs control to:
display filter information regarding a filter and first information regarding content in a first area of a display screen; and
display, in a case where a user performs a first operation, the filter information and second information regarding the content in a second area of the display screen, the second area being greater than the first area.

REFERENCE SIGNS LIST

10 Display control device
20 Remote controller
30 Display control device
40 Display device
101 Signal input unit
102 Signal processing unit
103 Display control unit
104 Operation receiving unit
105 Screen generation unit
106 Display unit
301 Signal input unit
302 Signal processing unit
303 Display control unit
304 Operation receiving unit
305 Screen generation unit
401 Display unit
1000 Computer
1001 CPU

The invention claimed is:

1. A display control device comprising
a display control unit configured to:
  display a first screen including a television program image on an entire screen of a display unit;
  display a second screen including the television program image on the entire screen of the display unit, filter information on a first area of the display unit and a first program guide superimposed on the television program image, wherein the filter information and the first program guide are displayed in different areas superimposed on the television program image,
  display a third screen including a second program guide on the entire screen of the display unit, the television program image on a second area of the display unit and the filter information on a third area of the display unit,
  display a fourth screen including the television program image on the entire screen of the display unit and detailed program information superimposed on the television program,
  perform a transition from the first screen to the second screen, the third screen or the fourth screen, and
  perform a transition between the second screen and the third screen, or between the second screen and the fourth screen in accordance with a single operation of a directional key of a cross button provided on a remote controller in a case where there is no target to be selected on a current screen, other than the transition, in a direction corresponding to the single operation,
wherein the filter information includes at least information identifying filters for filtering according to a type of program, the information identifying the filters is selectable, and the information identifying the filters includes at least two categories from the group consisting of favorite, drama, movie, music, and sport.

2. The display control device according to claim 1, wherein the first program guide and the second program guide include information corresponding to the filter information.

3. The display control device according to claim 1, wherein the display control unit is configured to switch from the second screen to the third screen, in a case where an operation corresponding to a downward direction is performed.

4. The display control device according to claim 1, wherein, in case the second screen is displayed, the filter information is superimposed on the television program image.

5. The display control device according to claim 1, wherein a size of the television program image in the third screen is smaller than a size of the television program image in the first screen.

6. The display control device according to claim 1, wherein the second program guide includes information on channels and broadcasting time.

7. The display control device according to claim 1, wherein the second program guide includes information on programs in a same time on different channels.

8. The display control device according to claim 1, the display control device is a television receiver comprising the display unit.

9. The display control device according to claim 1, wherein the filter information includes at least a filter corresponding to registered favorites.

10. The display control device according to claim 1, wherein the display control unit is configured perform a transition from the first screen to the second screen, the third screen or the fourth screen in accordance with an operation of an allocated key provided on the remote controller.

11. A display control method performed by a display control device, the method comprising:
  displaying a first screen including a television program image on an entire screen of a display unit;
  displaying a second screen including the television program image on the entire screen of the display unit, filter information on a first area of the display unit and a first program guide superimposed on the television program image, wherein the filter information and the first program guide are displayed in different areas of the display unit and superimposed on the television program image,
  displaying a third screen including a second program guide on the entire screen of the display unit, the television program image on a second area of the display unit and the filter information on a third area of the display unit,
  displaying a fourth screen including the television program image on the entire screen of the display unit and detailed program information superimposed on the television program image,
  performing a transition from the first screen to the second screen, the third screen or the fourth screen, and
  performing a transition between the second screen and the third screen, or between the second screen and the fourth screen in accordance with a single operation of a directional key of a cross button provided on a remote controller in a case where there is no target to be selected on a current screen, other than the transition, in a direction corresponding to the single operation,
wherein the filter information includes at least information identifying filters for filtering according to a type of program, the information identifying the filters is selectable, and the information identifying the filters includes at least two categories from the group consisting of favorite, drama, movie, music, and sport.

12. The display control method according to claim 11, wherein the first program guide and the second program guide include information corresponding to the filter information.

13. The display control method according to claim 11, wherein the method includes switching from the second screen to the third screen, in a case where an operation corresponding to a downward direction is performed.

14. The display control method according to claim 11, wherein, in case the second screen is displayed, the filter information are superimposed on the television program image.

15. The display control method according to claim 11, wherein a size of the television program image in the third screen is smaller than a size of the television program image in the first screen.

16. The display control method according to claim 11, wherein the second program guide includes information on channels and broadcasting time.

17. The display control method according to claim 11, wherein the second program guide includes information on programs in a same time on different channels.

18. The display control method according to claim 11, wherein the filter information includes at least a filter corresponding to registered favorites.

19. The display control method according to claim 11, the transition from the first screen to the second screen, the third screen or the fourth screen is performed in accordance with an operation of an allocated key provided on the remote controller.

20. A non-transitory computer-readable medium having stored thereon a computer-readable program for causing a computer to function as a display control unit configured to:
  display a first screen including a television program image on an entire screen of a display unit;
  display a second screen including the television program image on the entire screen of the display unit, filter information on a first area of the display unit and a first program guide superimposed on the television program, wherein the filter information and the first program guide are displayed in different areas of the display unit and superimposed on the television program image,
  display a third screen including a second program guide on the entire screen of the display unit, the television program image on a second area of the display unit and the filter information on a third area of the display unit,
  display a fourth screen including the television program image on the entire screen of the display unit and detailed program information superimposed on the television program,
  perform a transition from the first screen to the second screen, the third screen or the fourth screen; and
  perform a transition between the second screen and the third screen, or between the second screen and the fourth screen in accordance with a single operation of a directional key of a cross button provided on a remote controller in a case where there is no target to be selected on a current screen, other than the transition, in a direction corresponding to the single operation,
  wherein the filter information includes at least information identifying filters for filtering according to a type of program, the information identifying the filters is selectable, and the information identifying the filters includes at least two categories from the group consisting of favorite, drama, movie, music, and sport.

* * * * *